Figure 1:

(No Model.)

W. H. SAWYER.
ELECTRIC CABLE.

No. 478,367. Patented July 5, 1892.

Fig. 3ª.

Fig. 4ª.

WITNESSES
Frank C. Lockwood
Joseph A. Gately

INVENTOR
William H. Sawyer
By his Attorney
Granville Pierce

United States Patent Office.

WILLIAM HENRY SAWYER, OF PROVIDENCE, RHODE ISLAND, ASSIGNOR TO THE AMERICAN ELECTRICAL WORKS, OF SAME PLACE.

ELECTRIC CABLE.

SPECIFICATION forming part of Letters Patent No. 478,367, dated July 5, 1892.

Application filed February 18, 1892. Serial No. 421,935. (No model.)

*To all whom it may concern:*

Be it known that I, WILLIAM HENRY SAWYER, residing at Providence, in the county of Providence and State of Rhode Island, have invented certain Improvements in Electric Cables, of which the following is a specification.

This invention relates to electric cables, and more especially to those which comprise a number of electrical conductors.

It is well known that to construct multiple-conductor electrical cables having a working efficiency of the highest order certain conditions must be observed. The insulation covering of each conductor must be high and uniform, and the electrostatic capacity or charge-holding properties of each insulated conductor must be as low as possible. The construction of the cable must, moreover, be such that there shall be a minimum of inductive interference between the different conductors, and it is likewise requisite that these electrical properties must be attained without depreciating the mechanical strength of the cable. In cables whose conductors in whole or in part are to form portions of circuits with which are connected electrical receiving-instruments capable of being affected by extremely-feeble currents—such, for example, as delicate galvanometer receivers or telephones—it is especially essential that the resistance and capacity of the conductor shall be minimized and that the practical neutralization of disturbance-producting induction shall be provided for.

The object of this invention is the construction of a cable based upon the above conditions which has a lower electrostatic capacity than has heretofore been compatible with high insulation and which at the same time is, in virtue of its mode of manufacture, of great mechanical strength.

Many of the non-conducting media which have been employed to insulate cable-conductors, while possessing high insulation resistance, have unfortunately a high specific inductive capacity—such, for instance, being the case with gutta-percha, india-rubber, paraffine, and like substances. It is, however, well known that dry air is a remarkably good non-conductor and, further, that its electrostatic capacity is very low. Thus if any practical way can be found to employ it in electrical cables it is obvious that advantageous results will accrue.

The invention comprises a cable in which the several conductors, to secure inductive neutrality and the avoidance of interfering disturbance therefrom, are preferably arranged in pairs, the two members of each pair forming a portion of the direct and return conductors, respectively, of a given metallic circuit. It is necessary that the two conductors of each such circuit, to secure immunity from induction, shall be equidistant from other conductors, as otherwise there can be no balance, and heretofore and prior to this invention such equidistance and consequent balance have been secured by twisting the insulated members of each pair together, so that a multiple-circuit cable has been made up of a number of such twisted pairs; but circuits so made up into a cable have necessarily a high electrostatic capacity, whether the conductors forming them are connected in metallic or earth-completed circuits, for in the former case the capacity to be considered is that between each wire and its mate, and these being very close together and separated only by the thickness of the insulation covering the two the capacity is necessarily high, while in the latter case, in which the capacity to be considered is that of each conductor to earth, it is clear that as the several wires are parts of earth-completed circuits a conductor, in connection with the earth, is thus brought into close communion with the individual conductor we are considering and the result is the same as in the first case the capacity is high, and the result is a cable-conductor which has a considerable tendency to receive a charge and which therefore distorts and retards the passage of varying currents. Based upon these principles cables have heretofore been constructed in which, though the conductors are not arranged in twisted pairs, their inductive neutrality is achieved, first, by arranging the conductors in individual sets or groups of not more than four—that is to say, two pairs—and by arranging the plane of each of the two pairs at a right angle to and bisecting that of the other or the four conductors at opposite quadrantal points of a circle, and second, by so relatively disposing the several groups of four as to avoid parallelism between the conductors of any group and an immediately adjacent group, this feature being brought about by giving the first four conductors a helical twist in a given direction—say, right-handed—and then by adding the second four to the said group, giving them, however, a helical twist in the opposite—that is to say, in a left-handed direction—by which means the conductors of the second four cross those of the first nearly at a right angle continually and four inductively neutral pairs are provided over which to construct a larger cable, other sets may in the same way be braided. The electrostatic capacity of such a cable has been kept down by braiding the conductors into a tubular form in such a way that each conductor of the pair is at the opposite side of the tube from its mate, and at a considerable distance from any other conductor, while notwithstanding such construction which involves a certain looseness of braid, the rigidty of the cable has been maintained by interbraiding a filling of fibrous and porous threads or cords with the conductors, which, though affording by its porosity a very considerable extent of air-space, has imparted a certain homogeneity adapted to prevent a collapse of the cable under the stain of its own conductors, and a consequent disarrangement of the said conductors and increase of electrostatic capacity.

My present invention consists in a solid and semi-rigid central foundation core which may preferably be made of twisted or braided insulated conductors, so that the said core also shall be utilizable to serve as a central base for the outer cable-conductors, although, if desired, the said foundation-core may be made of solid insulating material, such as jute, rope, or paper, and in braiding over the said foundation-core and without any filling of interbraided fibrous cords or twines, two series of four conductors, the four conductors of each series being at the four quadrantal points of a circle inscribed round them, the two series having opposite helical directions of winding, the necessary distance to insure a low capacity being maintained, and at the same time the necessary firmness being insured by braiding the conductors with wide intermediate spaces but solidly upon the core.

It also consists in forming a number of such braided constructions, each having a central foundation-core, as above, into a cable and providing them with a common external protective covering and, also, by superposing a second, and, if desired, a third compound longer pitched braid over the first.

The several conductors are firmly held in the required positions indicated above by being braided together, in a manner well understood by insulated-wire manufacturers, firmly upon the foundation-core. If the paired conductors of such a core are worked as metallic circuits, as they would preferably be, the equidistance of each conductor of each circuit from those of the other circuits is superadded to the distance apart and to the opposite helical direction of adjacent groups as an interference-preventing device; but if the said conductors each form part of a single-wire circuit the distance and opposite helical direction alone can be depended upon for this purpose and the neutralization is by no means so effectual. Even in this event, however, the capacity is low, and in this respect alone the result is a greatly-improved cable. The inner or central core may be composed, first, of insulating fibrous mass, as indicated above, or it may be formed, second, of four conductors loosely insulated with paper bunched and twisted together, or it may consist, third, of eight conductors braided together, four conductors or two pairs having a helical twist to the right, the other four conductors or two pairs having a helical twist to the left, being formed the same as its surrounding braid, except that they are braided closely without a central air-space. In either construction the electrostatic capacity of the central core-conductors, when such are employed, is slightly in excess of that of its surrounding conductors, forming a sleeve on said core, owing to the fact of their contiguity to each other and the consequent thinness of the air-space between them.

Eight insulated conductors in two series of opposite helical direction are braided over the central core, each being diametrically opposite in position throughout to some other one of the same helical direction, and when formed into metallic circuits the two conductors of each such circuit (or as it may be stated the two conductors of each pair) are those which are so diametrically opposite to each other. Although this braid of eight conductors is an open-work and has no interposed filling fibers, cords, or other supports, it having the central core-foundation, is sufficiently stiff and rigid to comply with all necessary mechanical requirements. Other eight conductors may now be interbraided over and concentric with the first layer—four in one helical direction and four in the other—and these in like manner may be formed into four additional double conductor-circuits, their reciprocal inductive neutrality being achieved by the same means as hereinbefore described, the capacity of each conductor measured to its mate being reduced by the relatively great width of the air-space, while inductive interference between them and the circuits of the inner group is substantially prevented by the fact that the conductors of this outer layer are braided with a longer pitch than that of the inner ones and also by the fact that by means of the braiding itself the conductors are prevented from paralleling each other. Other layers, as many as may be desired, can be added in like manner, and the cable is finished by being externally coated either with a strong woven or braided fabric, or, preferably, with a leaden pipe or tube.

Instead of making a large cable of successively larger braided tubes superimposed each over the preceding one, it is often preferable in practice to form a complete table of a number of the compound concentric and centrally-cored braided or woven conductors inclosed in a suitable protecting leaden pipe. In a cable constructed on this plan seven such compound braids may be employed, six of them surrounding the other, which is placed at the center.

Figure 2:
Figure 3:
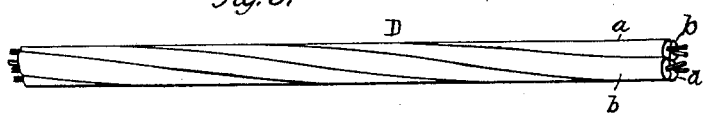
Figure 4:
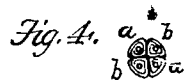
Figure 5:
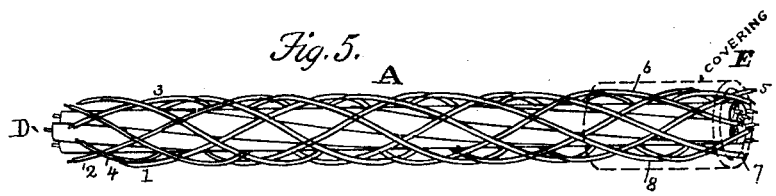
Figure 6:
Figure 7:
Figure 8:
Figure 8:
Figure 9:
Figure 9:
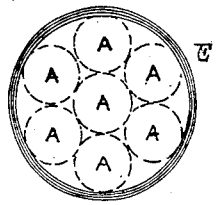

In the drawings which illustrate this invention, Figures 1 and 2 are respectively a side view and a cross-section of a central core for a cable, in which are eight insulated conductors braided together—four winding to the right and four to the left—forming a close and solid foundation-core having no central air tube or space. Figs. 3 and 4 are respectively a side view and a cross-section of a central foundation-core for a cable, in which the four conductors are insulated with paper loosely wound around them, the conductors being bunched together and twisted with a long twist; and Figs. 3$^a$ and 4$^a$ are a side view and cross-section of a foundation-core made wholly of insulating material. Figs. 5 and 6 are respectively a side view and cross-section of a cable having a solid core of four wires like that shown in Figs. 3 and 4 and having braided over it eight conductors, four winding to the right and four to the left. I have shown in dotted lines a section of lead or other covering for the cable. Figs. 7 and 8 are respectively a side view and cross-section of a cable having a central foundation-core and two concentric compound conductor-braids built up or superimposed thereon, the inner concentric braid being the same as shown in Figs. 5 and 6, the outer tubular compound conductor-braid being the same in all respects as the inner, excepting that the conductors have a longer pitch. Fig. 9 represents a cross-section of a compound cable composed of seven such cables as are represented in Figs. 5 or 7, inclosed in a suitable enveloping pipe.

Figs. 1 and 2 represent a braided core of eight conductors, four of which 1 2 3 4, comprising two pairs, are twisted to the right, and the other four 5 6 7 8, comprising other two pairs, having a twist to the left. They are lightly covered with cotton or other similar material and are braided lightly yet firmly together, so that there is no longitudinal or tubular air-space through the center thereof. The twist given the conductors, however, is of such length that each conductor is separated from its mate, except at the places they cross each other in the braid. The conductors of one direction cross those of the other direction at a considerable angle, thus keeping the reciprocal induction between the members of the two sets at a minimum, while that tending to be exercised between the several members of the second group is minimized in the same manner as that of the first, the capacity for the reason already stated being also kept low.

Figs. 2 and 3 represent a form of core employed by me in my improved cable as an alternative. It consists of four conductors in two pairs, each conductor being covered with paper loosely wound thereon. The four conductors are twisted together with a long twist, as shown. They make a comparatively solid core or filling of low capacity. Both of the forms of core shown are excellent for the purpose desired and over which to braid the other conductors to form my cable. It is not necessary that the central or foundation core be formed of conductors. If desired, it may, as shown in Figs. 3$^a$ and 4$^a$, be formed solid of any suitable fibrous or non-fusible insulating material, such as rope, jute, twines braided or otherwise, cotton, or paper, it being apparent that a foundation-core thus formed, while not serviceable in affording additional conductors, is equally serviceable for use as a solid foundation for a superimposed loose braiding of insulated conductors, whereby each conductor of such braid may be enabled to retain its necessary position without the aid of interposed fibrous filling-cords.

In Fig. 5 the next step is indicated. In this figure four conductors 1, 2, 3, and 4, forming a left-handed helix, and four others 5, 6, 7, and 8, forming a right-handed helix, are shown, these being arranged, as before, for connection in pairs, 1 with 2, 3 with 4, 5 with 6, and 7 with 8, and interbraided in the manner indicated above; but as this compound conductor is braided over the central core (which has an approximately circular cross-section) it is evident that it virtually forms an openwork tube, which by its interior surface closely clasps the said foundation-core, and the two members of each pair of conductors of which such open-work tube is formed are universally so arranged that they are at diametrically-opposite points of the said open-work tube, and, as a consequence, the plane of each pair is at a right-angle to and bisects that of the other pair in the same group of four having like helical direction, notwithstanding the said helical lay-up. The conductors of one direction cross those of the other direction at a very considerable angle, thus keeping the reciprocal induction between the members of the two sets at a minimum, while that tending to be exercised between the several members of the second group is minimized in the same manner as is that of the first, the capacity, for the reason already stated, being also kept low. Fig. 6 shows the appearance of such a compound core if cut across.

In Fig. 7 the inner compound braided conductor A is made exactly as that shown in Fig. 5 and has an outer tubular compound conductor B having four pairs braided or woven over it, as shown, the conductors whereof, like those of Fig. 5, being interbraided or interwoven with each other, and clasp the interior braid, which consequently supports them firmly and with a sufficient degree of rigidity. The relation of the two conductors of each pair with the two of the other pair of like direction is the same as is found in the inner tubular braid. Two of the pairs, as in Fig. 5, are braided with a right-handed and two with a left-handed helix. The pitch given to the helices or spiral curves is greater than is given to the conductors of the inner tube. A third tubular conductor formation may in turn be braided over the layer B and, if desired, a fourth, thus forming an entire cable built up of such layers and externally protected by the leaden tube or pipe E or any suitable sheath. This, of course, will, however, be the number of desired circuits and by mechanical considerations. One very practical mode of forming a complete cable in accordance with this invention is shown in Fig. 9, where a number (seven) of single tubular cores or sub-cables A, each made up as in Fig. 5, are inclosed in a suitable external sheathing E. This, if desired, may be of braided or woven coarse fibrous material, but a leaden or leaden-alloy tube is preferred, into which the several cores or sub-cables may together be drawn. Thus the requisite mechanical strength is imparted to the cable as a whole, its component parts being already strong in virtue of their mode of manufacture. Such a leaden tube E is indicated as being the external protecting-envelope of the section of cable shown in Fig. 5.

It will now be evident that by my invention a multiple-conductor cable may be manufactured, in which the several conductors, when joined in pairs, form an inductively-neutral system, which does not require the members of each pair to be twisted together, which has high insulation and low capacity in virtue of the mode in which the insulating and low capacity characteristics of dry air are utilized and in which the said properties are maintained constant and unchanged, while strength is imparted to the elements of the cable by interbraiding them, as described herein, upon a solid foundation-core, which is constructed in the preferred way, affords additional conductors, thus effecting great economy of space.

I claim—

1. The combination, in an electric cable, substantially as hereinbefore described, of a central solid foundation-core and a tubular multi-conductor braid formed thereon and supported thereby, the said tubular braid being composed of two pairs of insulated conductors braided or woven together in a uniform helical direction, the plane of the cross-section of each of the said pairs being at a right angle to and bisecting that of the other.

2. In an electric cable, the combination of a solid central foundation-core and an open-work tube of independent insulating conductors braided or woven thereover, resting thereon and supported thereby, the said open-work braid being composed of two groups of conductors, each group comprising two pairs of braided insulated conductors of uniform helical direction, the plane of the cross-section of each pair being at a right angle to and bisecting that of the other and the helical direction of the conductors of each group being reversed with respect to those of the other, substantially as described.

3. The combination, in an electric cable, of a stiff and solid central foundation-core consisting of twisted or braided insulated conductors, with four insulated conductors braided thereover into the form of an open-work tube compressing the said foundation-core and maintained in position thereby, the four said conductors being arranged in two pairs of uniform helical direction, the plane of the cross-section of each pair being perpendicular to the center of the plane of the other, substantially as described.

4. The combination, in an electric multi-conductor cable, of a stiff and solid central foundation-core formed of two or more pairs of insulated conductors twisted or braided together, and two groups of insulated conductors braided thereover into the form of an open-work tube compressing the said foundation-core and held in place thereby, each of the said groups comprising four conductors arranged in pairs, having a uniform helical direction, the plane of each pair taken at any cross-section of the cable being perpendicular to the center of the plane of the other, the helical direction of the conductors of one of the said groups being opposed to that of the other, substantially as described.

5. In an electric cable, a central foundation-core composed of two or more insulated conductors braided or woven together into a firm and solid strand, a series or layer of insulated conductors in two groups, respectively, of opposite helical direction braided tightly over said core into a tubular open-work, its two groups each comprising two pairs of conductors adapted, as described herein, to form portions of inductively-neutral metallic circuits, and one or more successive similar series of conductors braided each over the immediately-preceding interior series into successive concentric tubes, each compressing its inner neighbor, the conductors of each succeeding series being braided with a longer pitch or at an increased angle to those of each underlying series, substantially as described.

6. An electric cable comprising a tubular open-work series of insulated conductors braided over and upon a solid central foundation-core formed of a number of pairs of conductors twisted or braided, as indicated, the said series being composed of two groups, each comprising two pairs, the helical direction of the conductors of one group being opposed to that of the other and the two pairs of each group being each arranged so that at any point of cross-section the plane of each pair is at a right angle to the center of the plane of the other, other successive similar series braided over and resting upon the immediately-preceding similar series, the conductors of each being braided with a longer pitch than the immediately-underlying series, and an external protective sheath, such as a lead pipe, inclosing the whole, substantially as and for the purpose described.

7. An electric cable comprising a protecting envelope or sheath, such as a tube of lead or lead alloy, and a series of compound cores or sub-cables inclosed symmetrically therein, each of the said sub-cables consisting of a solid and semi-rigid central core and one or more concentric series braided over and upon said central core into the form of an open-work tube, each of the said series comprising two groups of two pairs of conductors each, the pairs of each group being each arranged in a plane vertical to the center of the other, and the four conductors of each group being all braided in a direction similar to those of the same group, but opposed to that of the other group, substantially as specified herein.

In testimony whereof I have signed my name to this specification, in the presence of two subscribing witnesses, this 8th day of February, 1892.

WILLIAM HENRY SAWYER.

Witnesses:
GILMAN E. JOPP,
W. A. HATHAWAY.